US006313465B1

(12) United States Patent
Nittoh et al.

(10) Patent No.: US 6,313,465 B1
(45) Date of Patent: Nov. 6, 2001

(54) RADIATION DISCRIMINATIVE MEASURING APPARATUS AND RADIATION DISCRIMINATIVE MEASURING METHOD

(75) Inventors: Koichi Nittoh; Takeshi Takahara; Yukihiro Fukuta; Chikara Konagai, all of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/239,967

(22) Filed: Jan. 29, 1999

(30) Foreign Application Priority Data

Mar. 25, 1998 (JP) .................................. 10-098410

(51) Int. Cl.[7] .................................. G01T 1/24; G01T 1/20
(52) U.S. Cl. ...................................... 250/370.11; 250/368
(58) Field of Search .................................. 250/367, 368, 250/370.11

(56) References Cited

U.S. PATENT DOCUMENTS

| 4,029,963 | * | 6/1977 | Alvarez et al. ....................... 250/360 |
| 5,276,329 | * | 1/1994 | Hughes ............................ 250/370.11 |
| 5,313,065 | | 5/1994 | Reed . | |

(List continued on next page.)

FOREIGN PATENT DOCUMENTS

| 60-188869 | * | 9/1985 | (JP) ....................................... 250/367 |
| 61-184444 | | 8/1986 | (JP) . | |
| 8-29901 | | 2/1996 | (JP) . | |

OTHER PUBLICATIONS

Annual Book of ASTM Standards, vol. 03.03, E 748–90, pp. 314–322, "Standard Practices for Thermal Neutron Radiography of Materials", Feb., 1991.

Annual Book of ASTM Standards, vol. 03.03, E 545–91, pp. 213–217, "Standard Method for Determining Image Quality in Direct Thermal Neutron Radiographic Examination", Jul., 1991.

Patent Abstracts of Japan, vol. 98, No. 1, Jan. 30, 1998, JP 09–236669, Sep. 9, 1997.

(List continued on next page.)

*Primary Examiner*—F L Evans
*Assistant Examiner*—Zandra Smith
(74) *Attorney, Agent, or Firm*—Oblon, Spivak, McClelland, Maier & Neustadt, P.C.

(57) ABSTRACT

A radiation discriminative measurement is performed by using a radiation discriminative measuring apparatus which comprises a radiation source for radiating radiations, first, second and third scintillators disposed in a region which is irradiated with the radiations radiated from the radiation source, and an image pickup means to deal with the light beams emitted from the first, second and third scintillators and the discrimination measurement includes the steps of arranging the first, second and third scintillators in a region which is irradiated with the radiations radiated from the radiation source, causing the first scintillator to respond to type A, type B and type C radiations radiated from the radiation source and to emit alight beam in a first wavelength region, causing the second scintillator to respond to type B and type C radiations which pass through the first scintillator so as to to emit a light beam in a second wavelength region, and causing the third scintillator to respond to a type C radiation which passes through the third scintillator so as to emit a light beam in a third wavelength region which is different from said first and second wavelength regions. The data of the scintillators are corrected in accordance with the wavelengths and the measurement of radiations according to the type thereof is discriminated and simultaneously measured.

39 Claims, 4 Drawing Sheets

U.S. PATENT DOCUMENTS

| | | |
|---|---|---|
| 5,317,158 | 5/1994 | McElhaney et al. . |
| 5,393,981 | 2/1995 | Szabo et al. . |
| 5,548,123 * | 8/1996 | Perez-Mendez ................ 250/370.11 |

OTHER PUBLICATIONS

Patent Abstracts of Japan, vol. 12, No. 217 (E–624), Jun. 21, 1988, JP 63–012179, Jan. 19, 1988.

Patent Abstracts of Japan, vol. 7, No. 220 (P–226), Sep. 30, 1983, JP 58–113842, Jul. 6, 1983.

Patent Abstracts of Japan, vol. 11, No. 9 (P–534), Jan. 10, 1987, JP 61–184444, Aug. 18, 1986.

Koichi Nittoh et al., "Discriminated Neutron and X–ray Radiography using Multi–color Scintillation Detector", Nuclear Instruments & Methods in Physics Research— Section A, vol. 428, 1999, pp. 583–588.

\* cited by examiner

RADIATION DISCRIMINATIVE MEASURING APPARATUS AND RADIATION DISCRIMINATIVE MEASURING METHOD

BACKGROUND OF THE INVENTION

1. [Technical Field of the Invention]

The present invention relates to a radiation discriminative measuring apparatus and a radiation discriminative measuring method for use in industries and research facilities, such as a nuclear industry, a radiology and facilities using radioactivity and capable of discriminating and measuring a radiation from radiations (radioactive rays) in which α ray, β ray, X ray, γ ray and neutron ray are mixed and enabling a nondestructive test to be performed.

2. [Prior Art]

When radiations penetrate a substance, absorption and scattering vary depending on the type and shape of the substance. If the states of the absorption and scattering are recorded by the photography, a video tape or a digital file, a state of breakage or damage of the substance, change in the substance and a state of charge can be recognized. In such case, a principle similar to that with which the internal state of the human body is diagnosed with X rays is employed. This method of detecting the internal state without breaking an object or a sample required to be measured is called radiography or a nondestructive radiography.

Hitherto, a method using the X ray or the γ ray among various radiations has been known as the radiography. The X ray or the γ ray is able to easily penetrate an object. Moreover, these rays are able to easily penetrate the object if the object has a light weight. Therefore, these rays are widely used to detect the internal state of an object. However, the X ray or they ray easily penetrates an object if the object has light weight. Therefore, the foregoing rays easily penetrate light elements having small atomic numbers. As a result, a substance containing hydrogen or the like concealed in a metal material cannot easily be inspected. Moreover, the X ray or the γ ray cannot easily discriminate a small difference, for example, the difference between boron and carbon which are elements having adjacent atomic numbers.

As an alternative to the X ray or γ ray, radiograph using neutrons has been used. The radiography of the foregoing type is able to discriminate light elements which are contained in a metal object and which cannot be discriminated by the X ray or the γ ray because absorption of neutrons does not depend on the atomic number and neutrons penetrate heavy substances. Each element has inherent absorption and scattering cross sectional area with respect to the neutrons such that neutrons are absorbed by boron in a large quantity. On the other hand, neutrons are not considerably absorbed by carbon. Therefore, nondestructive inspection using neutrons to discriminate light elements has been employed.

At present, radiography using the advantages of both of the radiography using X ray or γ ray and the radiography using neutrons has been employed. Specifically, pyrotechnic product has been nondestructively inspected. The radiography using, the X ray or γ ray and neutrons must perform two times of processes for inspecting one sample by using the X ray or γ ray and neutrons. Therefore, a long measuring time is required and a complicated operation must be performed.

As a method of overcoming the above-mentioned problems, a simultaneous radiography method has been disclosed in, for example, Japanese Patent Laid-Open Publication No. SHO 58-113842, in which californium $^{252}$Cf is employed as a neutron source and a γ ray source. Moreover, a γ ray image detector and a neutron image detector are disposed adjacently so as to simultaneously record images on films set to the detectors. However, the above-mentioned method requires two films for recording images. Therefore, accurate position alignment cannot be performed and a complicated image process must be performed.

A method structured by modifying the above-mentioned simultaneous radiography method has been disclosed in, for example, Japanese Patent Laid-Open Publication No. SHO 61-184444, in which a γ ray image and a neutron image are measured in accordance with the color.

However, the above-mentioned method, having an advantage in that a γ ray image and a neutron image can be measured in accordance with the color, suffers from the following problems.

The simultaneous radiography disclosed in Japanese Patent Laid-Open Publication No. SHO 61-184444 employs combination of a red-light emitting scintillator for a γ ray image and a blue- or green-light emitting scintillator for neutrons. Thus, a γ ray image and a neutron image are measured in accordance with the color.

In actual, the scintillator for the γ ray image has a structure that a fluorescent material emitting red light is applied or evaporated on the surface of a heavy-metal plate. On the other hand, the scintillator for neutrons has a structure that a fluorescent material for emitting blue or green light is mixed or applied to a substance containing lithium (Li-6) or boron (B-10). Neutrons and lithium or boron cause (n, α) reaction, causing alpha (α) rays to be generated which develops the blue-light fluorescent material to develop blue color. The blue-light emitting fluorescent member contains a fluorescent material which is zinc sulfide (ZnS:Ag) is employed which is activated with silver.

The method uses one film on which a neutron radiography is recorded in blue, and X ray or γ ray radiography is recorded in red to discriminate the image in accordance with the color. Although the above-mentioned method is able to correct fog caused from the X ray and the γ ray. Moreover, the foregoing method using the fluorescent member in the form of combined with zinc sulfide (ZnS:Ag) activated with silver has an advantage that the amount of fogging with respect to the X ray or the γ ray can be reduced. However, realized sensitivity has been unsatisfactory.

The employed scintillator is not formed of a material through which the γ ray and the neutrons are able to penetrate. Therefore, it was required to employ a structure in which scintillators are disposed in such a manner that a film is interposed between a scintillator for a γ ray image and a scintillator for neutrons. Therefore, it was difficult as a usable technique to perform light emission of three or more colors by disposing three scintillators.

In a case where a film is interposed, since a usual color film has an antihalation layer, a light applied from the rear side of the film cannot accurately be recorded. Therefore, a special color film must be employed, thus causing a problem to arise in that the cost cannot be reduced.

On the other hand, a method for improving the sensitivity to neutrons has been developed. An imaging plate for neutrons has been developed as disclosed in, for example, Japanese Patent Laid-Open Publication No. HEI 4-290985. In comparison with the conventional type using lithium (Li-6) or boron (B-10), the disclosed method has improved sensitivity to neutrons. This method utilizes a stimulation light emission of the fluorescent material which is a phenomenon causing light to be emitted by means of stimulus, such as heat or light, after irradiation with electron rays or radiations. The imaging plate has a structure formed by applying a stimulus fluorescent material. Specifically, the imaging plate uses gadolinium (Gd) in the reactions with neutrons. Moreover, activating material is a sintered material containing praseodymium (Pr), terbium (Tb) or europium (Eu).

The above-mentioned imaging plate has been improved into a developed structure formed by combining an imaging plate for the X ray and an imaging plate for neutrons which is made of lithium (Li-6), boron (B-10) or gadolinium (Gd).

The imaging plate for neutrons has a structure incorporating the stimulus fluorescent material and arranged to capture and store a signal caused from ionizing radiation as a color center. Moreover, a light beam emitted from a reading unit causes fluorescent light to be emitted so as to form an image. Therefore, the described method has advantages that a high sensitivity to neutrons can be realized and an operation in a bright region is permitted. However, there arises a problem in terms of performing a real-time operation because an individual reading operation must be performed after neutrons have been applied. Since the above-mentioned technique has been developed to be adaptable to X ray, high sensitivity to the X ray and that to the γ ray can be realized. Therefore, there arises a problem in that images cannot be distinguished from one another because the X ray and γ ray images cover a neutron image. Furthermore, in this case, neutrons must be shielded and the X ray and γ ray images must be individually be taken so as to process the images. However, the above-mentioned method has not been developed.

SUMMARY OF THE INVENTION

An object of the present invention is to substantially eliminate defects or drawbacks encountered in the prior art described above and to provide a radiation discriminative measuring apparatus which is capable of discriminating radiations (radioactive rays) consisting of, for example, α rays, β rays, γ rays, neutron rays and X ray and forming the discriminated radiations into images without any time lag by directly photographing (imaging) the radioactive rays.

Another object of the present invention is to provide a radiation discriminative measuring method with which a sensitive image can be formed by correcting fogging of a picked image by improving the material and thickness of scintillators.

These and other objects of the present invention can be achieved by providing, in one aspect, a radiation discriminative measuring apparatus comprising:

a radiation source for radiating radiations;

first, second and third scintillators disposed in a region which is irradiated with the radiations radiated from the radiation source together with a subject to be measured, the first scintillator being arranged to respond to type A, type B and type C radiations radiated from the radiation source so as to emit a light beam in a first wavelength region, the second scintillator being arranged to respond to the type B and type C radiations which pass through the first scintillator so as to emit a light beam in a second wavelength region, and the third scintillator being arranged to respond to the type C radiation which pass through the second scintillator so as to emit a light beam in a third wavelength region which is different from the first and second wavelength regions; and an image pickup means disposed on a rear side of the subject to be measured adapted to recognize light beams emitted from the first, second and third scintillators according to the wavelength region and to discriminate and simultaneously measure the type of the radiations.

In preferred embodiments of this aspect, in the radiation discriminative measuring apparatus, the data of the first scintillator is corrected with the data of the second and third scintillators and the data of the second scintillator is corrected with the data of the third scintillator so that the image pickup means discriminates and measures the type of the radiations with the corrected data.

The image pickup means comprises a color film which recognizes and records the radiations according to the wavelength.

The image pickup means comprises a photodetector for recognizing the radiations according to the wavelength. The photodetector is a CCD camera or an image pickup tube.

The photodetector may comprise a plurality of monochrome CCD cameras or image pickup tubes arranged for the respective wavelengths and a dichroic mirror for separating wavelengths of light beams emitted from the scintillators.

The photodetector is disposed apart from the first, second and third scintillators and the apparatus further comprises an optical fiber for transmitting signals of the scintillators disposed between the photodetector and the scintillators.

The radiation discriminative measuring apparatus may further comprises an image intensifier for amplifying signals of the scintillators and improving the sensitivity, the image intensifier being disposed in place of the optical fiber or together with thereof, or attached to the photodetector. The image pickup means is provided with an integrated-type and film detachable image pickup cassette for accommodating the color film, the first, second and third scintillators. The first scintillator or the second scintillator is red- or green-light emitting thermal neutron scintillator, substances containing hydrogen are disposed between the first scintillator and the second scintillator, and thermal neutrons emitted from the first scintillator and fast neutrons emitted from the second scintillator are simultaneously measured in accordance with the wavelength of emitted light.

According to the structure of the above-mentioned aspect enables the radiation discriminative measurement to be performed.

That is, in detail, the image pickup means for recording signals emitted in accordance with the wavelength is a color film so that the signals are recorded on one film. The conventional film method for using a film has employed the industrial X ray film because of its sensitivity and the resolution of the image quality. However, since the above-mentioned method is a monochrome method, the wavelength components cannot individually be read from the film on which the signals have been recorded. The industrial X ray film has surfaces coated with emulsion which are provided for one side and both sides with respect to the base film. Therefore, even if such film is set inversely with respect to the scintillator, recording is permitted. However, a usual color film cannot be used in such a manner that scintillators arranged to emit lights in different colors are interposed with respect to the film. Therefore, a structure will be described herein later is employed, in which the wavelengths of light emitted by the second and third scintillators are allowed to pass through. This fact is applied to the structure in which a light receiving device, such as a camera, is employed.

When a monochrome CCD camera or an image pickup tube is employed, the structure is provided with a dichroic mirror having optimum permeability and reflectivity adaptable to the wavelength of light beams emitted from the scintillators. As a result, wavelengths can efficiently be identified and observed. When the photodetector is further simplified, a three-plate type CCD camera or a three-tube type camera may be provided.

Furthermore, the optical fiber may be disposed between the scintillator, which is emitting light, and a recording medium, such as a film, or a camera or photomultiplier so as to transmit a light signal. Therefore, the distance from the photodetector can be elongated. When a tapered fiber is directly disposed in close contact to a light receiving device of the camera, an optical image forming device, such as a lens, may be omitted.

In the above aspect, furthermore, the image intensifier and a microchannel plate may be disposed between the scintillator and the photodetector. Thus, light signals of weak light emission can be amplified and thus the sensitivity can be raised. When a structure of combination with the optical fiber is employed, a loss occurring in transmitting a signal can be prevented. When the microchannel plate or the like is employed to amplify the light signal, a structure incorporating a red-light emitting member as the fluorescent member disposed to the amplifying portion improves a wavelength sensitivity characteristic (having a sensitivity peak at about 700 nm) of the CCD camera, and the matching to the CCD camera can be improved. As a result, the sensitivity can further be improved.

Still furthermore, the color film is accommodated in the image pickup cassette which is able to shield scintillators emitting multiple colors so that an integrated structure is formed. Furthermore, since the film is made to be detachable, the films for the neutrons which have been individually provided can be integrated into one film. Therefore, the necessity of performing individual developing processes can be eliminated.

In the foregoing aspect, the first and second scintillators are red-light emitting or green-light emitting scintillators for emitting thermal neutrons. A resin containing hydrogen is interposed between the first scintillator and the second scintillator. Thus, the thermal neutrons emitted by the first scintillator and the fast neutrons emitted by the second scintillator are simultaneously measured in accordance with the wavelength of the emitted light beams. At this time, the thickness of the scintillator is determined to cause the first scintillator to substantially completely absorb the thermal neutrons. As described above, the scintillator mainly composed of gadolinium (Gd) which serves as the member for absorbing thermal neutrons is required to have a thickness of tens of mm. The fast neutrons are not absorbed by the first scintillator and allowed to pass through the same. Therefore, the resin containing hydrogen is used to decelerate the fast neutrons so as to convert the same into thermal neutrons. Then, the second scintillator for thermal neutrons are caused to emit light.

In another aspect of the present invention, there is provided a radiation discriminative measuring apparatus comprising:
  a radiation source for irradiating a subject to be measured with radiations;
  a plurality of optical fibers for transmitting light;
  a plurality of scintillators provided for the optical fibers and arranged to emit light according to a wavelength of the light transmitted from the scintillators; and
  shielding members disposed around the scintillators to shield radiations for the radiation other than that to be treated.

The optical fibers are arranged in series with each other or in parallel to each other in combination.

In this aspect, the structure, in which scintillators are collected to cause light, which is to be measured, to be emitted from one position is not employed. Further, the scintillators for emitting light beams having individual wavelengths are individually joined to the optical fiber. The shielding member is provided for each of the scintillators to shield radiations except for the required radiation. Moreover, the optical fibers for transmitting light are joined to one another in series or in parallel. Thus, the types of the radiations are measured in accordance with the color. Therefore, this aspect of the present invention enables a structure in which optical fibers are bundled or a structure, in which the optical fibers are individually disposed to be employed, thus being widely applicable in arrangement.

In a further aspect of the present invention, there is provided a radiation discriminative measuring method performed by a radiation discriminative measuring apparatus mentioned above, and the measuring method comprising the steps of:
  disposing a subject to be measured,
  arranging a first scintillator, a second scintillator and a third scintillator in a region which is irradiated with radiations radiated from a radiation source;
  causing the first scintillator to respond to type A, type B and type C radiations radiated from the radiation source and to emit alight beam in a first wavelength region;
  causing the second scintillator to respond to type B and type C radiations which pass through the first scintillator so as to to emit a light beam in a second wavelength region;
  causing the third scintillator to respond to a type C radiation which pass through the third scintillator so as to emit a light beam in a third wavelength region which is different from said first and second wavelength regions;
  recognizing light beams emitted from the first, second and third scintillators according to the wavelength region;
  correcting data of the first scintillator with data of the second and third scintillators; and
  correcting data of the second scintillator with data of the third scintillator so that measurement of radiations according to the type thereof is discriminated and simultaneously measured in accordance with the wavelength.

In this aspect, the type A of the radioactive ray is α ray, the type B is β ray and the type C is γ ray, the first scintillator incorporates a blue-light emitting member, the second scintillator incorporates a red-light emitting member and the third scintillator incorporates a green-light emitting member, and the α, β and γ rays are simultaneously measured by color discrimination.

There may be adapted that the type A of the radiation is β ray, the type B is neutron ray and the type C is γ ray, the first scintillator incorporates a blue-light emitting member, the second scintillator incorporates a red-light emitting member and the third scintillator incorporates a green-light emitting member, and β, neutron and γ rays are simultaneously measured by color discrimination.

The combination of the scintillators is changed to combination that the first scintillator incorporates a blue-light emitting member, the second scintillator incorporates a green-light emitting member and the third scintillator incorporates a red-light emitting member, combination of red, blue and green, that of red, green and blue, that of green, red and blue or that of green, blue and red in the sequential order from the first scintillator so that results of photographing (imaging) operations are classified in accordance with the difference in the combination of the colors.

The blue-light emitting scintillator comprises a plastic scintillator, a glass scintillator or a sintered body of a blue-light emitting material.

The red-light emitting scintillator comprises a sintered body of a red fluorescent material mainly composed of gadolinium (Gd) activated with europium (Eu) or chrome (Cr).

The green-light emitting scintillator comprises a sintered body of a green fluorescent material mainly composed of gadolinium (Gd) activated with praseodymium (Pr) or terbium (Tb).

The the blue fluorescent material is any one of cerium-activated yttrium aluminate ($YAlO^3$:Ce), cerium-activated yttrium silicate ($Y_2SiO_5$:Ce), cerium-activated gadolinium silicate ($Gd_2SiO_5$:Ce), niobium-activated yttrium tantalate ($YTaO_4$:Nb), europium-activated barium fluorochloride (BaFCl:Eu), silver-activated zinc sulfide (ZnS:Ag), calcium tungstate $CaWO_4$, cadmium tungstate $CdWO_4$, zinc tungstate $ZnWO_4$ or magnesium tungstate $MgWO_4$.

The red fluorescent material is any one of europium-activated gadolinium borate ($GdBO_3$:Eu), europium-activated gadolinium oxide ($Gd_2O_3$:Eu), europium-activated gadolinium oxysulfide ($Gd_2O_2S$:Eu), europium-activated gadolinium aluminate ($Gd_3Al_5O_{12}$:Eu), europium-activated gadolinium gallate ($Gd_3Ga_5O_{12}$:Eu), europium-activated gadolinium vanadate ($GdVO_4$:Eu), cerium- or chrome-activated gadolinium gallate ($Gd_3Ga_5O_{12}$:Ce) and Cr.

The green fluorescent material is any one of terbium-activated gadolinium oxide ($Gd_2O_3$:Tb), terbium-activated gadolinium oxysulfide ($Gd_2O_2S$:Tb) praseodymium-activated gadolinium oxysulfide ($Gd_{22}S$:Pr), terbium-activated gadolinium gallate ($Gd_3Ga_5O_{12}$:Tb) and terbium-activated gadolinium aluminate ($Gd_3Al_5O_{12}$:Tb).

The type A of the radioactive ray is a neutron, the type B is X ray and the type C is γ ray so that the neutron, the X ray and the γ ray are simultaneously measured by color discrimination or the type A of the radioactive ray is a low-energy X ray, the type B is a medium-energy X ray and the type C is a high-energy X ray or γ ray so that the X rays according to the energy or the X ray and the γ ray are simultaneously measured by color discrimination.

The scintillators have structures which permit penetration of wavelengths of light beams emitted from combined scintillators.

In the present invention, the scintillators for emitting light beams having individual wavelengths are adapted to the types A, B and C of the radiations. In particular, the first scintillator is designed to have high sensitivity with respect to radiation A. Since the first scintillator has sensitivity to B type and C type radiation in the strict sense, a result covered with the B and C type radiations is obtained. Therefore, the first scintillator has a thickness with which the radiation A can completely be shielded. If the type A of the radiation is α ray, the scintillator must have a thickness of several mm. If the type A is the β ray, the β ray can be shielded if the thickness is tens of mm or greater. The second scintillator is designed to have high sensitivity to types B and C of radiations rays which pass through the first scintillator, in particular to the type B radiation. If the type B of the radiation ray is β ray or neutron ray to be described later, the scintillator is required to have a small thickness of tens of mm. If the thickness of such scintillator is enlarged, the sensitivity to the X ray and that to the γ ray are raised excessively. The third scintillator is designed to have high sensitivity to type C radiation which cannot be shielded by the second scintillator and which thus penetrates the second scintillator. Since the type C radiation passes through the first, second and third scintillators, geometrical blurring takes place, causing the resolution to deteriorate. It is preferable that the third scintillator has a small thickness and high sensitivity to the γ ray if possible. The second and third scintillators satisfactorily permit penetration of first, second and third wavelengths of emitting light beams. The light beams emitted by the scintillators are recorded or observed in accordance with the wavelength. Then, each fogging is corrected according to information of images in accordance with the color so as to extract signals caused from pure radiations. If the first scintillator emits blue light, the blue-light signal contains information of radiation A. Moreover, the blue-light signal contains information of radiations B and C. If the second scintillator emits red light, information of the radiations B and C can mainly be obtained.

In general, color signals of color TV are RGB signals (R: Red, G: Green and B: Blue) from which information is read and displayed. Therefore, the RGB signals can directly be recognized without a necessity of an image process. Since the sensitivity of each scintillator and the ratio of the types of radiations in environments for the measurement are not constant, correction must be performed. Then, the correction is performed such that information of the third scintillator is subtracted from information obtained from the second scintillator because information obtained by the third scintillator is information of only the radiation C. Thus, information of only the radiation B is obtained. Since information of the first scintillator contains information of the three types of the radiations A, B and C, information (the radiations B and C) of the second scintillator is subtracted from information of the first scintillator. As a result, information of the radiation B can be deleted from information of the first scintillator. However, information of the radiation C is undesirably and simultaneously deleted. Therefore, if information of the radiation C is excessively subtracted, correction can be performed with only information of the radiation C obtained from the third scintillator. When measurement is previously performed with a proofreading indicator or the like, information of each of the types A, B and C of the radiations can simultaneously be observed.

Therefore, according to the present invention, fogging of information obtained from the first, second and third scintillators is corrected so that accurate information is obtained.

The ranges of the radiations in a substance are such that the range of the β ray is longer than that of the α ray. Moreover, the range of the γ ray is longer than that of the β ray. Therefore, the structure is devised such that the thicknesses of the scintillators are reduced in a direction from the side of incidence of the radiations. Moreover, a contrivance is employed in such a manner that the scintillators having satisfactorily small thicknesses can be employed. Contrary to the structure mentioned above, a structure, in which the types A, B and C of the radiations are γ ray, β ray and α ray, respectively, and the first scintillator is optimized to the γ ray, causes the β ray and the α ray to undesirably be shielded. In this case, the second and following scintillators become useless. Thus, the discrimination of the wavelengths in accordance with the types of the radiations cannot be performed.

Therefore, the present invention, having a structure in which the thicknesses of the scintillators are reduced in the direction from the side on which the radioactive rays are made incident, is able to simultaneously measure the α, β and γ rays by the color discrimination.

The α ray is omitted from the types of the radioactive rays. The types A, B and C of the radiations are β ray, the neutron ray and the γ ray. Although the range of the neutron ray is not shorter, i.e. longer than that of the γ ray, a structure in which gadolinium (Gd) which greatly absorbs neutrons is employed as the scintillator causes (n, γ) reactions to occur between the gadolinium and neutrons. If a gadolinium scintillator has a thickness of tens of mm, thermal neutrons can substantially completely be shielded. Since the electron beam has a range longer than ten mm by several mm, the gadolinium scintillator having the thickness of tens of mm causes the fluorescent material to adequately emit light with the electron beam. Therefore, a contrivance of the combination of the radiations enables a scintillator having another wavelength and made of gadolinium also having high sensitivity to the γ ray to be employed.

Therefore, the present invention can measure simultaneously the β ray, the neutron ray and the γ ray by the color discrimination.

In the above aspect, there is no substantial difference between the structure in which the second scintillator emits red light and the third scintillator emits green light and a converse structure. Therefore, if the measurement is performed such that the light emitting members are employed in the converse manner, the variation occurring depending on the condition for use and a place for use can be indicated as the difference in the color combination. For example, the neutrons are recorded in red and γ ray is recorded in green in a certain portion, while neutrons are recorded in green and γ ray is recorded in red in another certain portion. Therefore, the present invention enables a portion from which data has been obtained to be detected in accordance with the combination of the colors even if data is mixed later. Thus, arrangement of data can easily be performed.

According to the above aspect, a plastic scintillator, a glass scintillator or a sintered body of a blue-light emitting material is employed as the scintillator for emitting blue light. Moreover, the thickness is reduced. Therefore, blue light can be emitted from the first scintillator. Moreover, sensitivity to the a ray and that to the β ray can satisfactorily be improved.

Furthermore, a contrivance is employed to improve the sensitivity of the red-light emitting scintillator and to reduce the thickness of the scintillator, the contrivance being made such that a fluorescent material mainly made of gadolinium (Gd) having a large absorbing cross sectional area with respect to thermal neutrons is employed. To emit red light by means of electron rays discharged because of the (n, γ) reactions with the thermal neutrons, europium (Eu) or chrome (Cr) is employed.

Hitherto, the blue-light emitting scintillator has been structured such that boron (B) and lithium (Li) are employed as the main material with the reactions with thermal neutrons. The reactions with thermal neutrons have been performed such that a rays which are emitted because of the (n, α) reactions are used to cause the fluorescent material to emit light. Since the range of the α ray is shorter than that of the γ ray, it can be considered that the thickness of the blue-light emitting scintillator can be reduced. Since the blue-light emitting scintillator mainly made of boron and lithium has a small absorption cross sectional area as compared with that of gadolinium according to the present invention, enlargement of the thickness of the scintillator results in undesirable deterioration in the sensitivity. Therefore, the conventional material cannot reduce the thickness of the scintillator. When the conventional scintillator is employed as the second scintillator, the neutron rays cannot completely be shielded.

The present invention has a structure that the red-light emitting scintillator is made of the red-light emitting sintered body mainly made of gadolinium (Gd). Therefore, the thickness of the scintillator can be reduced and neutron rays can completely be shielded.

If a thick scintillator is employed, the distance from an object to be measured and a light receiving surface for recording is elongated. As a result, geometrical blurring will take place. When the scintillators for X rays and γ rays are employed, the use of the fluorescent material mainly composed of the gadolinium (Gd) according to the present invention causes the mutual actions between the X rays and the γ rays to easily occur because the atomic number is large. Therefore, even if the scintillator has a small thickness, the sensitivity can be raised. Therefore, the fluorescent material made of the above-mentioned material is employed.

The red-light emitting scintillator and the green-light emitting scintillator are disposed together so that the X ray and γ ray components covering the emitted red-light component are corrected with substantially the same sensitivity. Therefore, the foregoing aspect employs the fluorescent material mainly composed of gadolinium (Gd).

The red-light emitting scintillator and the green-light emitting scintillator may be interchanged. If the interchange of the scintillators is performed, the structure according to the present invention may be employed for neutrons. Therefore, the fluorescent material mainly composed of the gadolinium (Gd) is employed. When the red-light emitting scintillator and the green-light emitting scintillator are interchanged, green indicates a result of the thermal neutron ray and red indicates a result of the γ ray.

The wavelength of the emitted light is enabled to pass through even if scintillators are combined with one another. Thus, radioactive rays can discriminatively be measured.

In the foregoing aspect, a variety of materials will be employed as the blue-light emitting fluorescent material, as the red-light emitting fluorescent material, and as the green-light emitting fluorescent material.

Still furthermore, the X rays are simultaneously measured in accordance with the energy by the color discrimination as well as the α, β and γ rays.

Consequently, according to the various aspects of the present invention mentioned above, the radiation discriminative measuring apparatus (method) has the structure in which the first, second and third scintillators arranged to emit light by means of different radiations are the scintillators mainly composed of the same material. Thus, information can quickly be recorded on one color film. Moreover, observation with the CCD camera is permitted to spontaneously form color images in accordance with the radiation. As a result, the amount of irradiation of a subject to be measured, with the radiations can be reduced when a required inspection is performed. Thus, the exposure of the radiations can be reduced and time required to complete the measurement can be shortened. Only one measuring operation enables images by means of X ray and γ ray and an image by means of neutrons to simultaneously or individually be observed. Therefore, a bomb made of, for example, a plastic resin, which cannot be observed by X ray photograph, can be observed by using the neutron radiography to observe the fuse and the plastic body of the bomb. Therefore, an effect can be obtained in that the inspection quality and the accuracy can be improved. When the structure according to the present invention is employed as an apparatus for measuring radioactive rays, the discrimination method using the wavelengths can be employed in addition to the conventional method of discriminating radiations.

Therefore, the combinations of the discrimination methods can be increased. When a measuring system in which a plurality of detectors are collected is constituted, the reliability can be improved and the system can be simplified, thus being effective.

The further nature and characteristic features of the present invention will be made more clear from the following description made with reference to the accompanying drawings.

DESCRIPTION OF THE PREFERRED EMBODIMENTS

Embodiments of the present invention will now be described hereunder with reference to the accompanying drawings. The following embodiments are structured to measure radioactive substances for use in nuclear industry. In the described embodiment, a type A of the radiation is neutrons, a type B is X ray and a type C is γ ray. Neutron radiography for discriminatively measuring the radiations (radioactive rays) will now be described.

Figure 1:
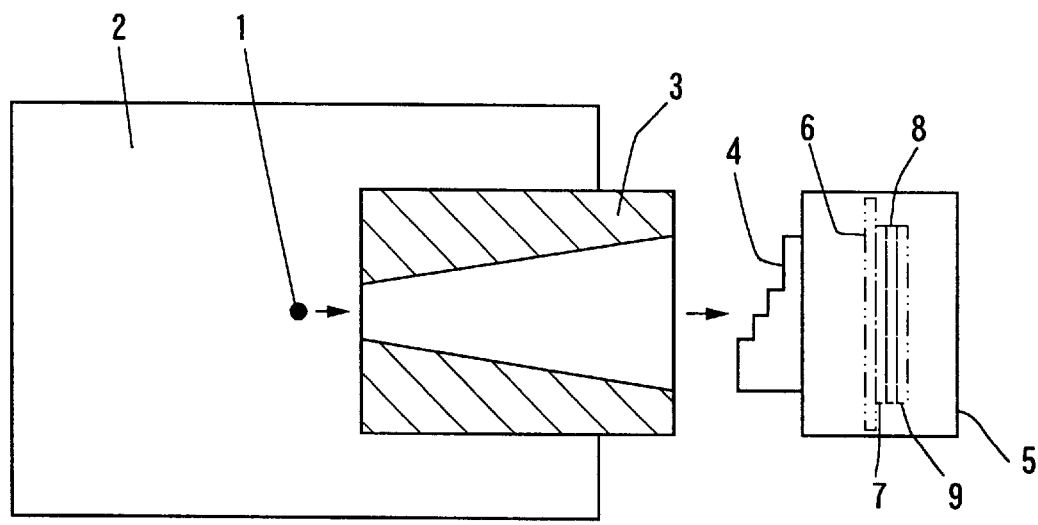
FIG. 1 is a diagram showing the basic structure of a system of neutron radiography according to a first embodiment of the present invention.
Figure 2:
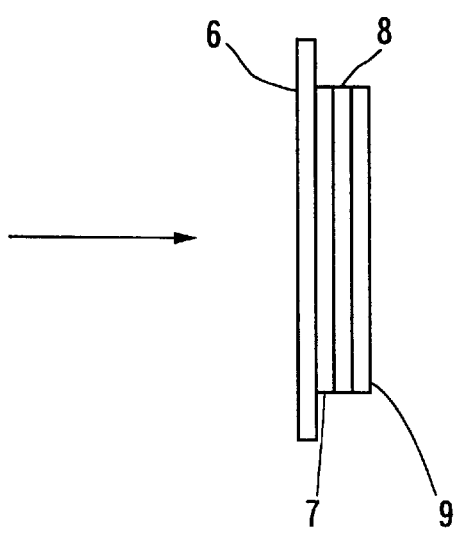
FIG. 2 is an enlarged view showing an example of a structure in the image pickup cassette shown in FIG. 1.

[First Embodiment] (FIG. 1 and FIG. 2)

FIG. 1 shows the basic structure of neutron radiography according to this embodiment. FIG. 2 shows an essential portion of an image pickup means of the neutron radiography.

As shown in FIG. 1, this embodiment has a structure that a radiation source is a neutron source 1. The neutron source 1 is accommodated in a moderator 2. Neutron beams emitted from the neutron source 1 sometimes contain X ray or γ ray. In the moderator 2, a collimator 3 is disposed at a position which is irradiated with neutron beams. The neutron beams converged by the collimator 3 are used to irradiate a subject 4 to be measured. To the rear portion of the subject 4, an image pickup cassette 5 serving as an image pickup means is disposed. As a result, radiations (neutrons, X ray or γ ray) allowed to pass through the subject 4 are detected as a radiation signal by the image pickup cassette 5 so as to be formed into an image.

As shown in FIG. 2 which is an enlarged view, this embodiment has a structure that the image pickup cassette 5 includes a detachable color film 6 which serves as a recording medium. The color film 6 has a first scintillator 7, a second scintillator 8 and a third scintillator 9 disposed sequentially. Each of the scintillators 7, 8 and 9 has a small thickness which permits penetration of each of light beams.

The first scintillator 7 is made of a red-light emitting material having high sensitivity to the neutron, for example, gadolinium oxysulfide ($Gd_2O_2S$) activated with europium (Eu). The first scintillator 7 has a thickness of, for example, 40 mm.

The second scintillator 8 is made of a green-light emitting material having high sensitivity to X ray, for example, gadolinium oxysulfide ($Gd_2O_2S$) activated with terbium (Tb). The second scintillator 8 has a thickness of, for example, tens of mm.

The third scintillator 9 is made of a blue-light emitting material having high sensitivity to γ ray, for example, zinc sulfide (ZnS) activated with silver (Ag). The third scintillator 9 has a thickness of, for example, tens of mm.

The first, second and third scintillators 7, 8 and 9 may be made of the other light emitting members, and in this case, a function similar to that obtainable from this embodiment will be also realized. The colors of emitted light consisting of red, blue and green may be varied as described above.

In this embodiment, green and blue light emitted by the second and third scintillators 8 and 9 are allowed to pass through the first and second scintillators 7 and 8 so as to provide a film shape. At this time, the light is sensitized in a state in which information items of the scintillators are subtracted.

FIG. 2 shows the structure that the color film 6 is disposed on the left-hand side which is the incident side for radioactive rays indicated with an arrow with respect to the scintillators 7, 8 and 9. With respect to the scintillators 7, 8 and 9, the color film 6 may be disposed in the direction after the radioactive ray has been allowed to pass through, that is, on the right-hand side of the drawing.

In this embodiment, the color film 6 can be developed so as to be observed or digitally processed by a scanner or the like so as to be observed as images of the radiations in accordance with the wavelength. Therefore, combinations of the first, second and third scintillators 7, 8 and 9 for emitting light by the different radiations enable the recording of information on one color film in a short time, which has been impossible for the conventional structure, to be performed. Therefore, color images in accordance with the radiations can instantaneously be observed. As a result, the amount of the radiations with which the subject 4 to be measured is radiated can be reduced when an inspection is performed. Thus, the amount of exposure can be reduced and time required to complete the measurement can be shortened.

Figure 3:
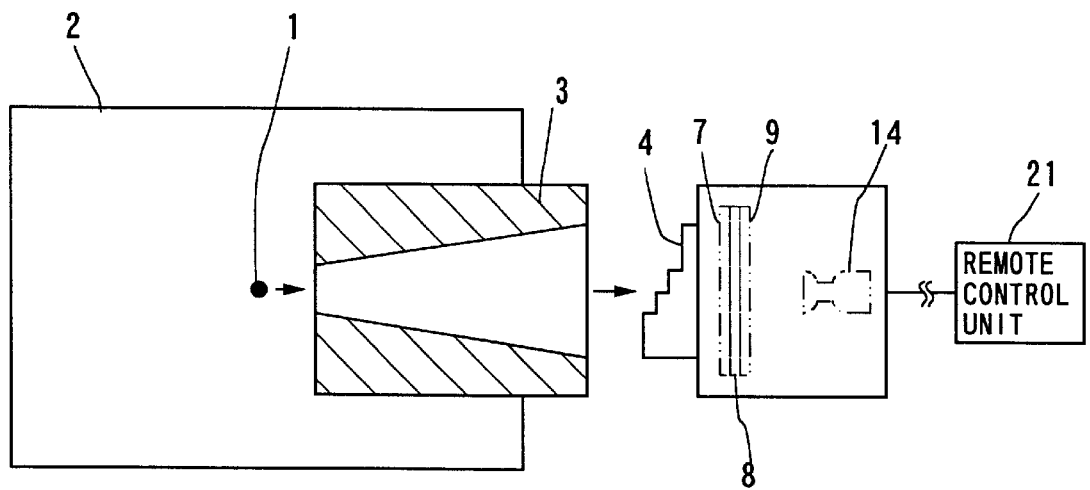
FIG. 3 is diagram showing a basic structure of a neutron radiography according to a second embodiment of present invention.
Figure 4:
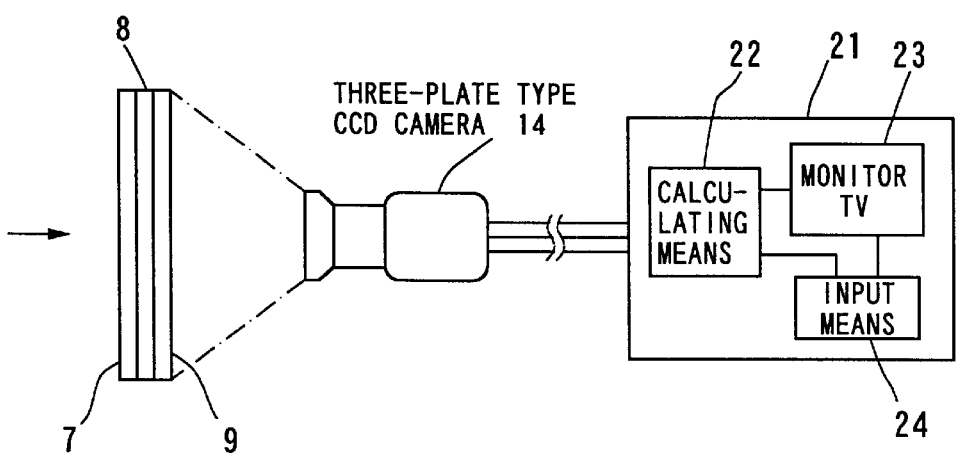
FIG. 4 is an enlarged view showing an example of a structure in the image pickup cassette shown in FIG. 3.
Figure 5:
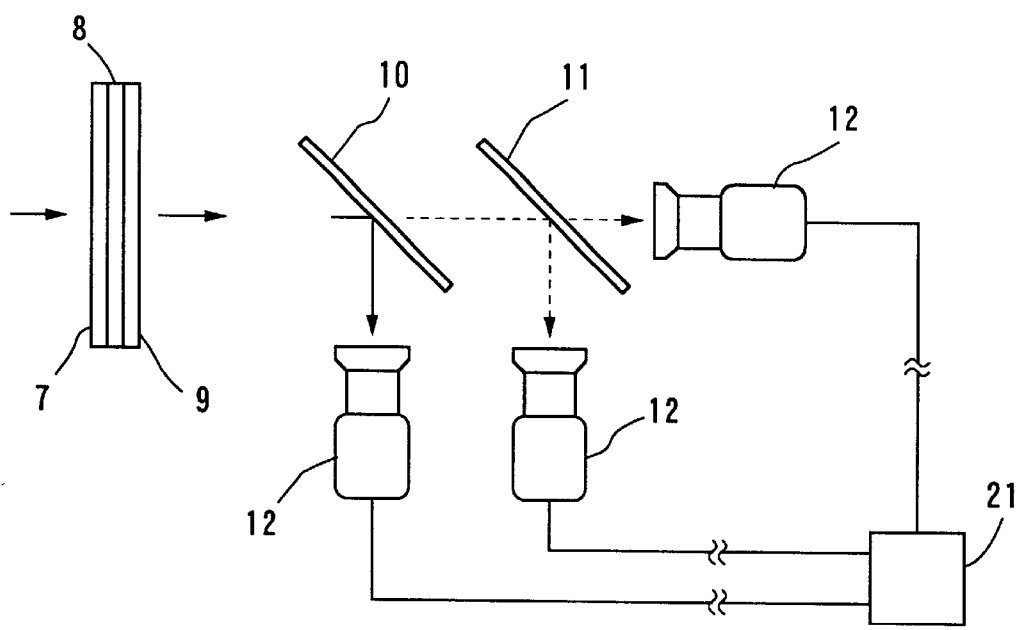
FIG. 5 is a diagram showing a modification of the structure shown in FIG. 4.

[Second Embodiment] (FIGS. 3 to 5)

This embodiment has a structure that the color film according to the first embodiment is replaced by a camera and an optical lens to directly observe an image. FIG. 3 shows the overall structure of the apparatus. FIG. 4 shows an essential portion of the apparatus.

As shown in FIGS. 3 and 4, this embodiment has a structure incorporating a three-plate type CCD camera 14. Thus, information of first, second and third scintillators 7, 8 and 9 which emit light by dint of different radiations is obtainable as an image signal. Furthermore, the image signal can be monitored by a remote control unit 21 connected to the three-plate type CCD camera 14. The remote control unit 21 incorporates a calculating means 22 for performing subtraction in accordance with information of three types of color light, a monitor television (TV) set 23 which is capable of displaying a result of the calculation and an input means 24 for operation.

Since this embodiment enables measurement to be performed through the remote control, the measurement can be performed without exposure of radioactive rays. Moreover, a time required for this measurement can be shortened. Since the observed signals are extracted as RGB signals, an image process can instantaneously be performed to correct fogging of X ray and γ ray and irregular irradiation of the area which must be irradiated. Since separated observation in accordance with the color on the monitor television set 23 is permitted, an advantage can be realized in that alignment of images having different wavelengths can be omitted.

FIG. 5 is a modification of the foregoing embodiment.

In this modification, three high-sensitive and monochrome CCD cameras 12 are employed. Light beams having different wavelengths and emitted by the scintillators 7, 8 and 9 can be separated by first and second dichroic mirrors 10 and 11 when an observation is performed.

That is, the dichroic mirror 10 reflects a light beam emitted from the first scintillator 7 and permits penetration of light beams emitted from the second and third scintillators 8 and 9. The second dichroic mirror 11 reflects the light beam emitted from the second scintillator 8 and permits the light beam emitted from the third scintillator 9. Images by the different light beams can individually be observed by the third CCD camera 12.

The above-mentioned structure enables the image obtained by each CCD camera 12 to independently be observed. Moreover, an image process can instantaneously be performed to correct fogging of X ray and γ ray and irregular irradiation to the area which must be irradiated. Since the structure incorporates the dichroic mirrors for strictly separating only specific wavelength, the ratio (SIN) of noise with respect to a signal can be improved.

Figure 6:
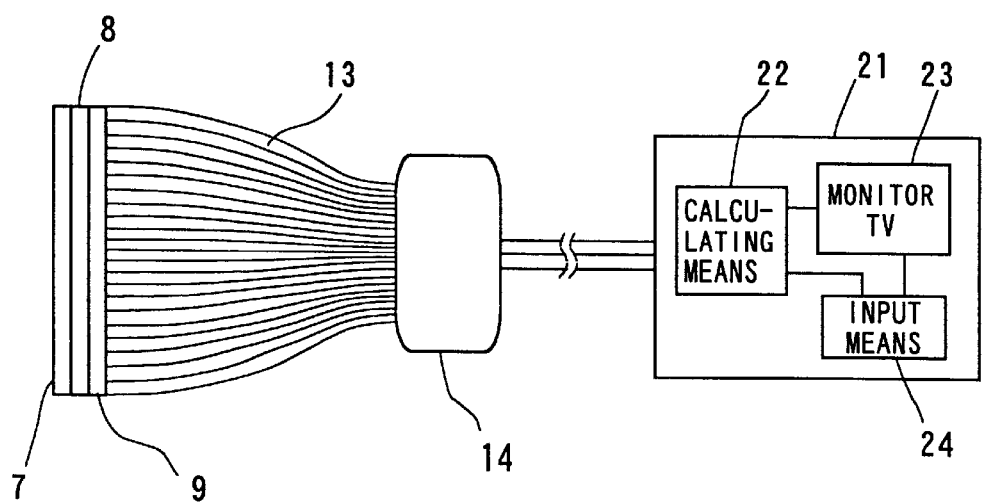
FIG. 6 is a diagram showing a third embodiment of the present invention.

[Third Embodiment] (FIG. 6)

The second embodiment mentioned above has the structure incorporating the CCD cameras and the optical lenses. This third embodiment incorporates an optical fiber in place of the optical lens. FIG. 6 shows an essential portion of the structure.

As shown in FIG. 6, this embodiment incorporates a number of optical fibers, for example, tapered fibers 13 which are bundled, each having a structure such that the cross sectional area of the light incident portion is larger than that of the light emission portion. The bundled tapered fibers 13 establish the direct connection between the third scintillator 9 and the light receiving surface of the CCD camera 14.

The above-mentioned structure also attains effects similar to those obtainable by the second embodiment.

Figure 7:
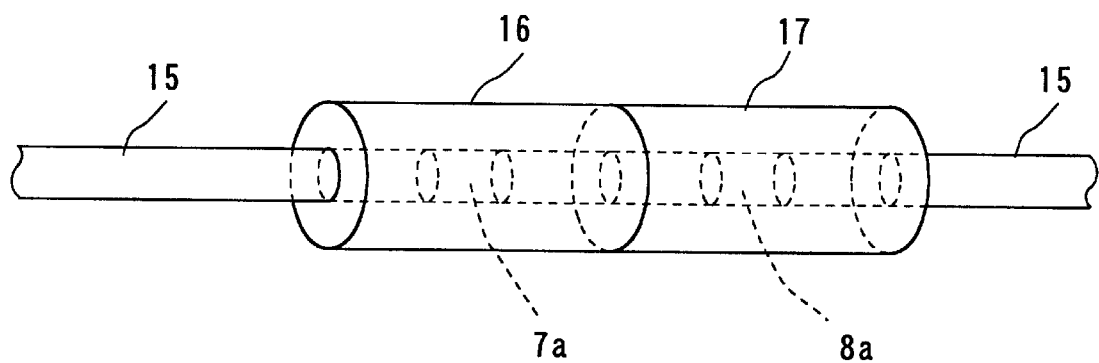
FIG. 7 is a diagram showing a first example of the structure according to a fourth embodiment of the present invention.
Figure 8:
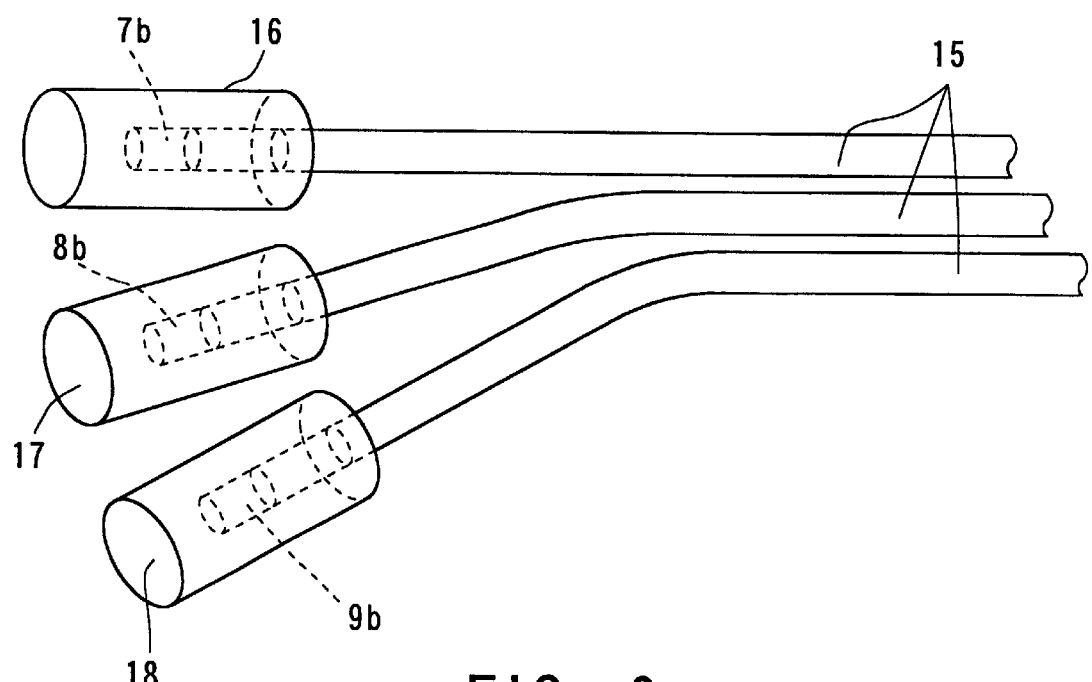
FIG. 8 is a diagram showing a second example of the structure according to the fourth embodiment of the present invention.

[Fourth Embodiment] (FIGS. 7 and 8)

This embodiment has a structure that a plurality of scintillators for emitting light beams having different wavelengths are joined to one or more optical fibers. The radiations are directly input from the scintillator portions on the optical fibers. Then, information of the light beams having different wavelengths are separated by a spectroscope, and in this manner, the information of the radiations is obtained.

FIG. 7 shows a first example of the structure of this embodiment.

As shown in FIG. 7, the first example has a structure that one optical fiber 15 includes first and second scintillators 7a and 8a arranged to respond to different radiations and wavelengths of light beams, the first and the second scintillators 7a and 8a being disposed adjacently.

The first scintillator 7a responds to, for example, γ ray. A Cd shielding member 16 having a predetermined thickness for cutting thermal neutrons covers the first scintillator 7a. The second scintillator 8a responds to neutrons, the second scintillator 8a being covered with a Pb shielding member 17 having a predetermined thickness for cutting the γ ray. Both ends of the optical fiber 15 are connected to a spectroscope, not shown.

Thermal neutrons of a light beam obtained by the first scintillator 7a is cut by the Cd shielding member 16 so as to mainly be formed into a light signal by means of the γ ray. Then, the light signal is supplied to a spectroscope through an end (for example, the left-hand end in FIG. 7) of the optical fiber 15. The γ ray of a light beam obtained by the second scintillator 7b is cut by the Pb shielding member 17 so as to mainly be formed into a light signal by means of the thermal neutrons. Then, the light signal is supplied to a spectroscope through another end (for example, a right-hand end) of the optical fiber 15.

According to this structure, the optical fiber 15 may be formed into, for example, a looped shape and the portions of the scintillators 7a and 7b may be disposed in the radiation region. In this case, the radiations rays can be observed in a remote control manner from a position apart from the radiation region. If a structure, in which the third scintillator is included together with the first and the second scintillators 7a and 7b, is employed, information of another radiation can be obtained. In this case, information of a plurality of light beams are transmitted through one optical fiber 15. When correction similar to each of the above-mentioned embodiments is performed, discrimination will be permitted. It is to be noted that the scintillators are not required to be disposed at one point of the one optical fiber and the scintillators may be disposed at a plurality of positions such that the scintillators are apart from one another. In this case, the radiations at a plurality of regions can be observed.

FIG. 8 shows another example of the structure of this embodiment.

As shown in FIG. 8, this example is structured such that first, second and third scintillators 7b, 8b and 9b responding to different radiations and emitting light beams having different wavelengths are included at the leading ends of, for example, three optical fibers 15. The other ends of the optical fibers are connected to a photodetector, not shown.

The first and second scintillators 7b and 8b are structured similarly to those shown in FIG. 7 and covered with a Cd shielding member 16 and a Pb shielding member 17, respectively. The third scintillator 9b is covered with a Cd cover 18 filled with a resin containing hydrogen. Thus, the Cd cover 18 cuts thermal neutrons. Moreover, the resin containing hydrogen converts fast neutrons into thermal neutrons.

In the above-mentioned structure, the three types of the light beams are extracted at the end of the optical fibers so as to be detected by the photodetectors disposed at the other ends. Thus, information of a plurality of radiations can be obtained. If information obtained by the first, second and third scintillators 7b, 8b and 9b include covering, a correction similar to that according to the first embodiment is performed to obtain accurate information.

In this example, the leading ends of the optical fibers 15 provided with the scintillators 7b, 8b and 9b are disposed in arbitrary radiation regions, so that the remote observation can be performed. When the correction of the plural light beams is performed at this time, accurate information can be obtained, being effective.

Although FIG. 8 shows the structure incorporating the three optical fibers, two optical fibers may be adopted, and moreover, four or more ones may be adopted.

Each of the foregoing embodiments may have a structure in which an image intensifier is interposed between the scintillator and the light receiving devices so as to improve the sensitivity.

The structures according to the foregoing embodiments may arbitrarily be combined with one another. For example, a structure may be employed in which the resin layer shown in FIG. 8 is interposed between the second scintillator 8 and the third scintillator 9 shown in FIGS. 2, 4, 5 and 6. In such examples, substantially the similar effect will also be attained.

In addition to the embodiments mentioned hereinabove, the materials for the scintillators may arbitrarily be employed in accordance with the subject or the environment.

It is to be noted that the present invention is not limited to the described embodiments and many other changes and modifications may be made without departing from the scopes of the appended claims.

What is claimed is:

1. A radiation discriminative measuring apparatus comprising:
    a radiation source for radiating radiations including a first ray, a second ray, and a third ray;
    first, second and third scintillators disposed in a region which is irradiated with the radiations radiated from said radiation source together with a subject to be measured, said first scintillator being arranged to respond to the first ray, the second ray, and the third ray radiated from said radiation source so as to emit a light beam in a first wavelength region, said second scintillator being arranged to respond to the second ray and the third ray which pass through the first scintillator so as to emit a light beam in a second wavelength region, and said third scintillator being arranged to respond to the third ray which passes through the second scintillator so as to emit a light beam in a third wavelength region which is different from said first and second wavelength regions; and
    an image pickup means disposed on a rear side of said subject to be measured which recognizes light beams emitted from said first, second and third scintillators according to the wavelength region and which discriminates and simultaneously measures the type of the radiations.

2. A radiation discriminative measuring apparatus according to claim 1, wherein data of said first scintillator is corrected with data of said second and third scintillators and data of said second scintillator is corrected with a data of said third scintillator and said image pickup means discriminates and measures the type of the radiations with the corrected data from the scintillators.

3. A radiation discriminative measuring apparatus according to claim 1, wherein said image pickup means comprises a color film which recognizes and records the radiations according to the wavelength.

4. A radiation discriminative measuring apparatus according to claim 1, wherein said image pickup means comprises a photodetector for recognizing the radiations according to the wavelength.

5. A radiation discriminative measuring apparatus according to claim 4, said photodetector is a CCD camera.

6. A radiation discriminative measuring apparatus according to claim 4, said photodetector is an image pickup tube.

7. A radiation discriminative measuring apparatus according to claim 4, wherein said photodetector comprises a plurality of monochrome CCD cameras arranged for the respective wavelengths and a dichroic mirror for separating wavelengths of light beams emitted from the scintillators.

8. A radiation discriminative measuring apparatus according to claim 4, wherein said photodetector comprises a plurality of image pickup tubes arranged for the respective wavelengths and a dichroic mirror for separating wavelengths of light beams emitted from the scintillators.

9. A radiation discriminative measuring apparatus according to claim 4, wherein said photodetector is disposed apart from said first, second and third scintillators and further comprising an optical fiber for transmitting signals of said scintillators disposed between the photodetector and the scintillators.

10. A radiation discriminative measuring apparatus according to claim 4, wherein said photodetector is disposed apart from said first, second, and third scintillators and further comprising an image intensifier for amplifying signals of said scintillators and improving the sensitivity.

11. A radiation discriminative measuring apparatus according to claim 9, further comprising an image intensifier for amplifying signals of said scintillators and improving the sensitivity, said image intensifier being disposed together with said optical fiber.

12. A radiation discriminative measuring apparatus according to claim 4, further comprising an image intensifier for amplifying signals of said scintillators and improving the sensitivity, said image intensifier being attached to said photodetector.

13. A radiation discriminative measuring apparatus according to claim 4, wherein said image pickup means is provided with an integrated-type and film detachable image pickup cassette for accommodating said color film, said first, second and third scintillators.

14. A radiation discriminative measuring apparatus according to claim 13, wherein said first scintillator or said second scintillator is red- or green-light emitting thermal neutron scintillator, substances containing hydrogen are disposed between said first scintillator and said second scintillator, and thermal neutrons emitted from said first scintillator and fast neutrons emitted from said second scintillator are simultaneously measured in accordance with the wavelength of emitted light.

15. A radiation discriminative measuring apparatus according to claim 1, wherein said first, second and third scintillators are disposed so as to provide a layer structure in this order from an entering direction of the radiation.

16. A radiation discriminative measuring apparatus comprising:
    a radiation source for irradiating a subject to be measured with radiations;
    a plurality of optical fibers for transmitting light;
    a plurality of scintillators provided for said optical fibers, arranged to emit different wavelengths of light, the different wavelengths of light indicating different types of radiation responded to by the plurality of scintillators; and
    shielding members disposed around said scintillators to shield radiations for the radiation other than that to be treated.

17. A radiation discriminative measuring apparatus according to claims 16, wherein said optical fibers are arranged in series with each other in combination.

18. A radiation discriminative measuring apparatus according to claim 16, wherein said optical fibers are arranged in parallel to each other in combination.

19. A radiation discriminative measuring method performed by a radiation discriminative measuring apparatus which comprises a radiation source for radiating radiations including a first ray, a second ray, and a third ray, first, second and third scintillators disposed in a region which is irradiated with the radiations radiated from said radiation source, and an image pickup means to deal with the light beams emitted from said first, second and third scintillators; said measuring method comprising the steps of:

disposing a subject to be measured, arranging the first, second and third scintillators in a region which is irradiated with the radiations radiated from the radiation source;

causing said first scintillator to respond to the first ray, the second ray, and the third ray radiated from the radiation source and to emit a light beam in a first wavelength region;

causing said second scintillator to respond to the second ray and the third ray which pass through the first scintillator so as to emit a light beam in a second wavelength region;

causing said third scintillator to respond to a the third ray which passes through the third scintillator so as to emit a light beam in a third wavelength region which is different from said first and second wavelength regions;

recognizing light beams emitted from the first, second and third scintillators according to the wavelength region;

correcting data of the first scintillator with data of the second and third scintillators; and correcting data of the second scintillator with data of the third scintillator so that measurement of radiations according to the type thereof is discriminated and simultaneously measured in accordance with the wavelength.

20. A radiation discriminative measuring method according to claim 19, wherein said first ray is α ray, said second ray is β ray and said third ray is γ ray, said first scintillator incorporates a blue-light emitting member, said second scintillator incorporates a red-light emitting member and said third scintillator incorporates a green-light emitting member, and the α, β and γ rays are simultaneously measured by color discrimination.

21. A radiation discriminative measuring method according to claim 19, wherein said first ray is β ray, said second ray is neutron ray and said third ray is γ ray, said first scintillator incorporates a blue-light emitting member, said second scintillator incorporates a red-light emitting member and said third scintillator incorporates a green-light emitting member, and β, neutron and γ rays are simultaneously measured by color discrimination.

22. A radiation discriminative measuring method according to claim 20, wherein combination of said scintillators is changed to combination that said first scintillator incorporates a blue-light emitting member, said second scintillator incorporates a green-light emitting member and said third scintillator incorporates a red-light emitting member, combination of red, blue and green, that of red, green and blue, that of green, red and blue or that of green, blue and red in the sequential order from said first scintillator so that results of photographing operations are classified in accordance with the difference in the combination of the colors.

23. A radiation discriminative measuring method according to claim 21, wherein combination of said scintillators is changed to combination that said first scintillator incorporates a blue-light emitting member, said second scintillator incorporates a green-light emitting member and said third scintillator incorporates a red-light emitting member, combination of red, blue and green, that of red, green and blue, that of green, red and blue or that of green, blue and red in the sequential order from said first scintillator so that results of photographing operations are classified in accordance with the difference in the combination of the colors.

24. A radiation discriminative measuring method according to claim 20, wherein said blue-light emitting scintillator comprises a plastic scintillator, a glass scintillator or a sintered body of a blue-light emitting material.

25. A radiation discriminative measuring method according to claim 21, wherein said blue-light emitting scintillator comprises a plastic scintillator, a glass scintillator or a sintered body of a blue-light emitting material.

26. A radiation discriminative measuring method according to claim 20, wherein said red-light emitting scintillator comprises a sintered body of a red fluorescent material mainly composed of gadolinium (Gd) activated with europium (Eu) or chrome (Cr).

27. A radiation discriminative measuring method according to claim 21, wherein said red-light emitting scintillator comprises a sintered body of a red fluorescent material mainly composed of gadolinium (Gd) activated with europium (Eu) or chrome (Cr).

28. A radiation discriminative measuring method according to claim 20, wherein said green-light emitting scintillator comprises a sintered body of a green fluorescent material mainly composed of gadolinium (Gd) activated with praseodymium (Pr) or terbium (Tb).

29. A radiation discriminative measuring method according to claim 21, wherein said green-light emitting scintillator comprises a sintered body of a green fluorescent material mainly composed of gadolinium (Gd) activated with praseodymium (Pr) or terbium (Tb).

30. A radiation discriminative measuring method according to claim 24, wherein said blue fluorescent material is any one of cerium-activated yttrium aluminate ($YAlO_3$:Ce), cerium-activated yttrium silicate ($Y_2SiO_5$:Ce), cerium-activated gadolinium silicate ($Gd_2SiO_5$:Ce), niobium-activated yttrium tantalate ($YTaO_4$:Nb), europium-activated barium fluorochloride (BaFCl:Eu), silver-activated zinc sulfide (ZnS:Ag), calcium tungstate $CaWO_4$, cadmium tungstate $CdWO_4$, zinc tungstate $ZnWO_4$ or magnesium tungstate $MgWO_4$.

31. A radiation discriminative measuring method according to claim 25, wherein said blue fluorescent material is any one of cerium-activated yttrium aluminate ($YAlO_3$:Ce), cerium-activated yttrium silicate ($Y_2SiO_5$:Ce), cerium-activated gadolinium silicate ($Gd_2SiO_5$:Ce), niobium-activated yttrium tantalate ($YTaO_4$:Nb), europium-activated barium fluorochloride (BaFCl:Eu), silver-activated zinc sulfide (ZnS:Ag), calcium tungstate $CaWO_4$, cadmium tungstate $CdWO_4$, zinc tungstate $ZnWO_4$ or magnesium tungstate $MgWO_4$.

32. A radiation discriminative measuring method according to claim 26, wherein said red fluorescent material is any one of europium-activated gadolinium borate ($GdBO_3$:Eu), europium-activated gadolinium oxide ($Gd_2O_3$:Eu), europium-activated gadolinium oxysulfide ($Gd_2O_2S$:Eu), europium-activated gadolinium aluminate ($Gd_3Al_5O_{12}$:Eu), europium-activated gadolinium gallate ($Gd_3Ga_5O_{12}$:Eu), europium-activated gadolinium vanadate ($GdVO_4$:Eu), cerium- or chrome-activated gadolinium gallate ($Gd_3Ga_5O_{12}$:Ce) and Cr.

33. A radiation discriminative measuring method according to claim 27, wherein said red fluorescent material is any one of europium-activated gadolinium borate ($GdBO_3$:Eu), europium-activated gadolinium oxide ($Gd_2O_3$:EU), europium-activated gadolinium oxysulfide ($Gd_2O_2S$:Eu), europium-activated gadolinium aluminate ($Gd_2Al_5O_{12}$:Eu), europium-activated gadolinium gallate ($Gd_3Ga_5O_{12}$:Eu), europium-activated gadolinium vanadate ($GdVO_4$:Eu), cerium or chrome-activated gadolinium gallate ($Gd_3Ga_5O_{12}$:Ce) and Cr.

34. A radiation discriminative measuring method according to claim 28, wherein said green fluorescent material is any one of terbium-activated gadolinium oxide ($Gd_2O_3$:Tb), terbium-activated gadolinium oxysulfide ($Gd_2O_2S$:Tb), praseodymium-activated gadolinium oxysulfide ($Gd_2O_2S$:Pr), terbium-activated gadolinium gallate ($Gd_3Ga_5O_{12}$:Tb) and terbium-activated gadolinium aluminate ($Gd_3Al_5O_{12}$:Tb).

35. A radiation discriminative measuring method according to claim 29, wherein said green fluorescent material is any one of terbium-activated gadolinium oxide ($Gd_2O_3$:Tb), terbium-activated gadolinium oxysulfide ($Gd_2O_2S$:Tb), praseodymium-activated gadolinium oxysulfide ($Gd_2O_2$:Pr), terbium-activated gadolinium gallate ($Gd_3Ga_5O_{12}$:Tb) and terbium-activated gadolinium aluminate ($Gd_3Al_5O_{12}$:Tb).

36. A radiation discriminative measuring method according to claim 19, wherein said type A of the radiation is a neutron, said type H is X ray and said type C is γ ray so that the neutron, the X ray and the γ ray are simultaneously measured by color discrimination or said type A of the radiation is a low-energy X ray, said type H is a medium-energy X ray and said type C is a high-energy X ray or γ ray so that the X rays according to the energy or the X ray and the γ ray are simultaneously measured by color discrimination.

37. A radiation discriminative measuring method according to claim 19, wherein said scintillators have structures which permit penetration of wavelengths of light beams emitted from combined scintillators.

38. A radiation discriminative measuring apparatus comprising:

a radiation source for radiating radiations including first ray, second ray and third ray; and first, second and third scintillators disposed in a region which is irradiated with the radiations radiated from said radiation source together with a subject to be measured, said first scintillator being arranged to respond to the first ray, the second ray and the third ray radiated from said radiation source so as to emit a light beam in a first wavelength region, said second scintillator being arranged to respond to the second ray and third ray which pass through the first scintillator so as to emit a light beam in a second wavelength region, and said third scintillator being arranged to respond to the third ray which passes through the second scintillator so as to emit a light beam in a third wavelength region which is different from said first and second wavelength regions.

39. A radiation discriminative measuring apparatus according to claim 38, wherein said first, second and third scintillators are disposed so as to provide a layer structure in this order from an entering direction of the radiation.

* * * * *